US012725458B2

(12) United States Patent
Hashimoto

(10) Patent No.: US 12,725,458 B2
(45) Date of Patent: Sep. 1, 2026

(54) SYSTEMS AND METHODS FOR VEHICLE PERFORMANCE OPTIMIZATION USING MACHINE LEARNING

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 246 days.

(21) Appl. No.: 18/648,849

(22) Filed: Apr. 29, 2024

(65) Prior Publication Data

US 2025/0336240 A1 Oct. 30, 2025

(51) Int. Cl.

| | |
|---|---|
| ***G07C 5/00*** | (2006.01) |
| ***G06F 40/20*** | (2020.01) |
| ***G07C 5/08*** | (2006.01) |

(52) U.S. Cl.

CPC ............. *G07C 5/006* (2013.01); *G06F 40/20* (2020.01); *G07C 5/0808* (2013.01); *G07C 5/085* (2013.01)

(58) Field of Classification Search

CPC ...... G07C 5/006; G07C 5/0808; G07C 5/085; G06F 40/20

See application file for complete search history.

(56) References Cited

U.S. PATENT DOCUMENTS

| | | | | |
|---|---|---|---|---|
| 9,881,428 | B2 * | 1/2018 | Barfield, Jr. | G05B 23/0254 |
| 2018/0362049 | A1 | 12/2018 | Avireddi et al. | |
| 2020/0097921 | A1 * | 3/2020 | Ghosh | G06N 3/09 |
| 2021/0034023 | A1 | 2/2021 | Keenan et al. | |
| 2024/0419905 | A1 * | 12/2024 | Mai | G06N 20/00 |

FOREIGN PATENT DOCUMENTS

| | | |
|---|---|---|
| JP | 2021-157612 A | 10/2021 |

* cited by examiner

*Primary Examiner* — Aryan E Weisenfeld

(74) *Attorney, Agent, or Firm* — Sughrue Mion, PLLC

(57) ABSTRACT

Provided are a method, system, and device for optimizing performance of a vehicle. The method may include, receiving vehicle condition data prior to operating the vehicle; generating, based on the vehicle condition data, input data for a machine learning (ML) model, wherein the ML model is configured to output at least one of predicted vehicle performance and vehicle parameters based on the vehicle condition data; suggesting, by the ML model, optimized vehicle parameters based on the input data; and sending, based on the optimized vehicle parameters, instructions to tune the vehicle.

18 Claims, 10 Drawing Sheets

SYSTEMS AND METHODS FOR VEHICLE PERFORMANCE OPTIMIZATION USING MACHINE LEARNING

Systems and methods consistent with example embodiments of the present disclosure relate to vehicle performance optimization using machine learning techniques.

BACKGROUND

In the related art, a vehicle operator and a vehicle mechanic may work in tandem in order to tune a vehicle to optimize the performance of vehicle operation (e.g., to improve the acceleration time of the vehicle, engine stability, etc.). Particularly, in the case of vehicle operation for motorsports, a vehicle operator may be able to provide feedback on the performance of the vehicle based on the conditions present at a racetrack (e.g., type of road, road conditions, weather, temperature, humidity, wind direction, wind speed, etc.), as well as any subjective performance details (speed, stability, etc.). Sensors which may be implemented in the vehicle may also be able to automatically provide feedback (e.g., speedometer, camera, etc.). The vehicle mechanic may make interpretations based on this feedback, and accordingly make tuning adjustments to the vehicle (e.g., software-based adjustments with respect to the Electronic Control Unit (ECU), or hardware-based adjustments with respect to physical parts of the vehicle (such as the suspension, tire pressure, etc.). Thereafter, the process of the vehicle operator providing feedback to the vehicle mechanic may be repeated so that the vehicle performance can eventually be optimized.

The related art may be exhaustive because it requires human interpretation of the data. For example, the vehicle mechanic may incorrectly interpret the data and suggest the incorrect tuning adjustment, and it may not be ascertained that the tuning adjustment was incorrect until the next iteration of the vehicle operator providing feedback. This may result in excessive time needed for optimal vehicle performance to be achieved.

While software modelling may be considered to be implemented in order to optimize performance of the vehicle, this does not implement machine learning (ML) models, and particularly does not include large language models (LLM). Furthermore, such software modelling may be difficult for a vehicle operator or vehicle mechanic to understand how to use, since technical software knowledge may be required.

In the related art, rule-based simulation software may be used to search for the best tuning adjustment by repeatedly simulating physical and mechanical phenomena, but this requires large computing resources and computation time, making it difficult to obtain the optimal tuning adjustment from input data in a timely manner.

Accordingly, there is a need for a vehicle performance optimization system which can implement machine learning while being simple for the end-user to operate.

SUMMARY

According to one or more example embodiments, apparatuses and methods are provided for optimizing performance of a vehicle. In particular, apparatuses and methods according to example embodiments receive a vehicle condition data prior to operating the vehicle, generate, based on the vehicle condition data, input data for a machine learning (ML) model, wherein the ML model may be configured to output at least one of predicted vehicle performance or vehicle parameters based on the vehicle condition data; obtain, based on the ML model, optimized vehicle parameters based on the input data; and send, based on the optimized vehicle parameters, instructions to tune the vehicle.

According to embodiments, the vehicle condition data may include a first report from a vehicle driver indicating the vehicle driver's condition, and a second report from a vehicle mechanic indicating the vehicle's condition, wherein generating the input data for the ML model may include converting, using a large language model (LLM), the first report and second report into machine-readable parameters.

According to embodiments, obtaining the optimized vehicle parameters may include interacting, with at least one of the driver and the vehicle mechanic, via a chat interface, wherein the chat interface is configured to iteratively suggest optimized vehicle conditions and optimized vehicle parameters from the LLM based on the predicted vehicle performance.

Sending the instructions to tune the vehicle may include: sending a first instruction to an Electronic Control Unit (ECU) of the vehicle to tune software-related parameters of the vehicle; and sending a second instruction to the vehicle mechanic to tune hardware-related parameters of the vehicle, wherein the second instruction is generated as an instruction manual using the LLM.

According to embodiments, the method may further include receiving vehicle performance data after operating the vehicle, generating, based on the vehicle performance data, a Requirements as Code (RaC) file using the LLM, generating, based on the RaC file, simulated vehicle data; and training the ML model based on simulated vehicle data.

Training the ML model may further be based on real vehicle data from the vehicle performance data, wherein the vehicle performance data comprises feedback from the vehicle driver, sensor data from the vehicle, and feedback from the vehicle mechanic, wherein the real vehicle data corresponds to the sensor data.

The RaC file may include: a file identifier which identifies the RaC file; driver information which identifies the vehicle driver and the vehicle driver's condition; vehicle information which identifies the vehicle model and the vehicle's condition; metric information which defines one or more metrics related to the vehicle's performance and criteria for fulfilling the one or more metrics; and environmental conditions during operation of the vehicle.

According to embodiments, the method may further include evaluating the ML model based on simulated vehicle data and/or the real vehicle data; and based on evaluating that the ML model fulfills the one or more metrics in the RaC file, deploying the trained ML model.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
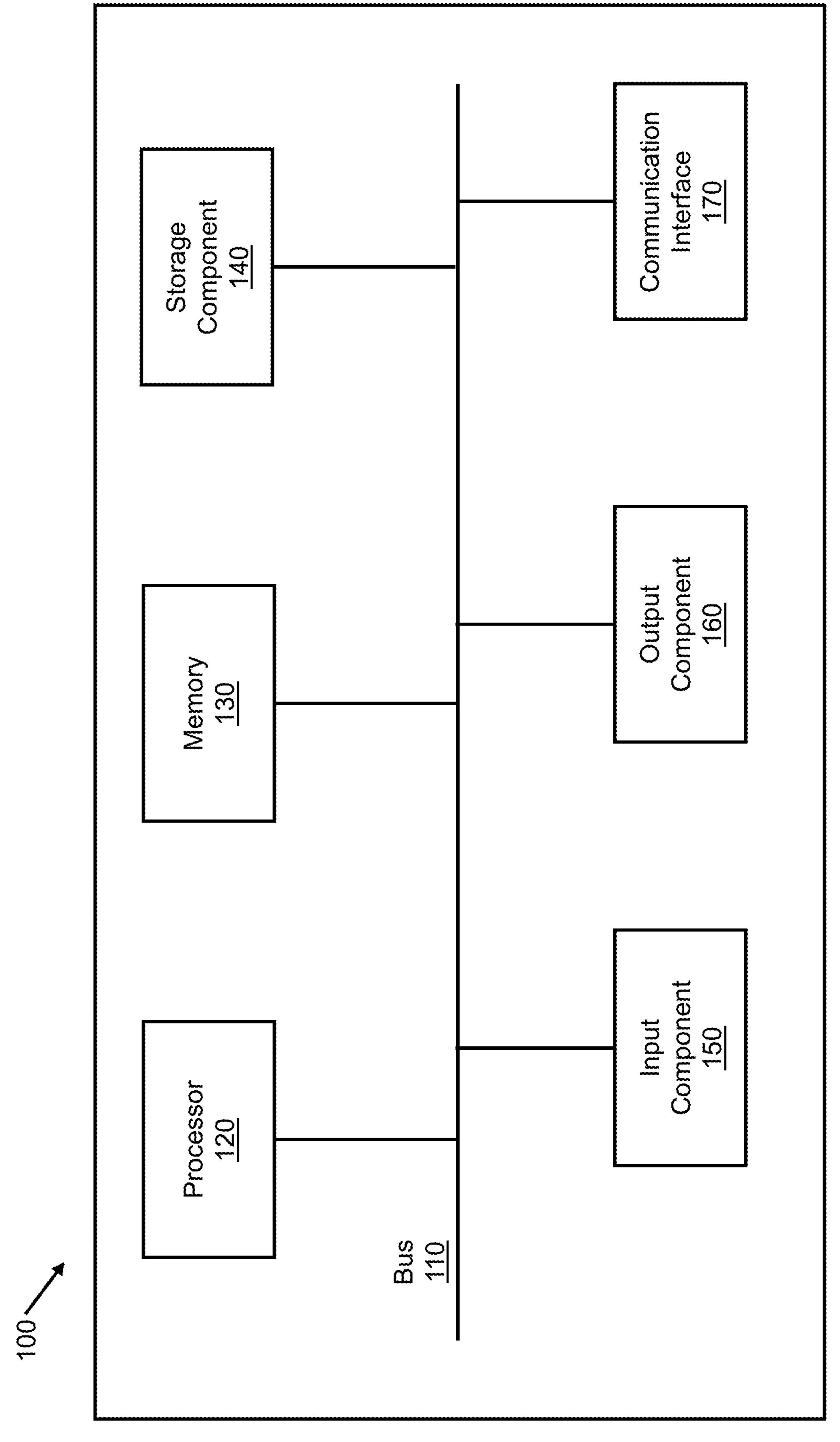
FIG. 1 is a diagram of example components of a device according to an example embodiment.

The following detailed description of example embodiments refers to the accompanying drawings. The disclosure provides illustration and description, but is not intended to be exhaustive or to limit one or more example embodiments to the precise form disclosed. Modifications and variations are possible in light of the disclosure or may be acquired from practice of one or more example embodiments. Further, one or more features or components of one example embodiment may be incorporated into or combined with another example embodiment (or one or more features of another example embodiment). Additionally, in the flowcharts and descriptions of operations provided herein, it is understood that one or more operations may be omitted, one or more operations may be added, one or more operations may be performed simultaneously (at least in part), and the order of one or more operations may be switched.

It will be apparent that example embodiments of systems and/or methods and/or non-transitory computer readable storage mediums described herein may be implemented in different forms of hardware, firmware, or a combination of hardware and software. The actual specialized control hardware or software code used to implement these systems and/or methods is not limiting of one or more example embodiments. Thus, the operation and behavior of the systems and/or methods and/or non-transitory computer readable storage mediums are described herein without reference to specific software code. It is understood that software and hardware may be designed to implement the systems and/or methods based on the descriptions herein.

Even though particular combinations of features are recited in the claims and/or disclosed in the specification, these combinations are not intended to limit the disclosure of possible example embodiments. In fact, many of these features may be combined in ways not specifically recited in the claims and/or disclosed in the specification. Although each dependent claim listed below may directly depend on only one claim, the disclosure of possible example embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

The term "software part", as used herein refers to an individual component or unit of software which may implement one or more feature(s). These software parts may be dependent on other software parts. A plurality of software parts which have the same software part type may also be provided. Specifically, a software part type may indicate what the software part is intended for (e.g., SDK, integration, for system testing, etc.). Each of these software part types may have standards (for example, ISO standards) which need to be passed in order for the software part to pass a specific developmental stage (for example, a coverage stage in which the user is still intending to collect and evaluate code coverage metrics only). These standards may be evaluated in terms of metrics. According to some embodiments, each software part may have an identifier including, but not limited to, a version number and a feature name.

FIG. 1 is a diagram of example components of a device 100. As shown in FIG. 1 device 100 may include a bus 110, a processor 120, a memory 130, a storage component 140, an input component 150, an output component 160, and a communication interface 170.

Bus 110 includes a component that permits communication among the components of device 100. The processor 120 may be implemented in hardware, firmware, or a combination of hardware and software. Processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In one or more example embodiments, the processor 120 includes one or more processors capable of being programmed to perform a function. The memory 130 includes a random access memory (RAM), a read only memory (ROM), and/or another type of dynamic or static storage device (e.g., a flash memory, a magnetic memory, and/or an optical memory) that stores information and/or instructions for use by the processor 220.

Storage component 140 stores information and/or software related to the operation and use of device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 150 includes a component that permits device 100 to receive information, such as via user input (e.g., a touch screen display, a keyboard, a keypad, a mouse, a button, a switch, and/or a microphone). Additionally, or alternatively, input component 150 may include a sensor for sensing information (e.g., a global positioning system (GPS) component, an accelerometer, a gyroscope, and/or an actuator). Output component 160 includes a component that provides output information from device 100 (e.g., a display, a speaker, and/or one or more light-emitting diodes (LEDs)).

The communication interface 170 includes a transceiver-like component (e.g., a transceiver and/or a separate receiver and transmitter) that enables device 100 to communicate with other devices, such as via a wired connection, a wireless connection, or a combination of wired and wireless connections. The communication interface 170 may permit the device 100 to receive information from another device and/or provide information to another device. For example, the communication interface 170 may include, but is not limited to, an Ethernet interface, an optical interface, a coaxial interface, an infrared interface, a radio frequency (RF) interface, a universal serial bus (USB) interface, a Wi-Fi interface, a cellular network interface, or the like.

The device 100 may perform one or more example processes described herein. According to one or more example embodiments, the device 100 may perform these processes in response to the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 170. When executed, software instructions stored in the memory 130 and/or the storage component 140 may cause the processor 120 to perform one or more processes described herein.

Additionally, or alternatively, hardwired circuitry may be used in place of, or in combination with, software instructions to perform one or more processes described herein. Thus, one or more example embodiments described herein are not limited to any specific combination of hardware circuitry and software.

The number and arrangement of components shown in FIG. 1 are provided as an example. In practice, the device 100 may include additional components, fewer components, different components, or differently arranged components than those shown in FIG. 1. Additionally, or alternatively, a set of components (e.g., one or more components) of the device 100 may perform one or more functions described as being performed by another set of components of the device 100.

Figure 2:
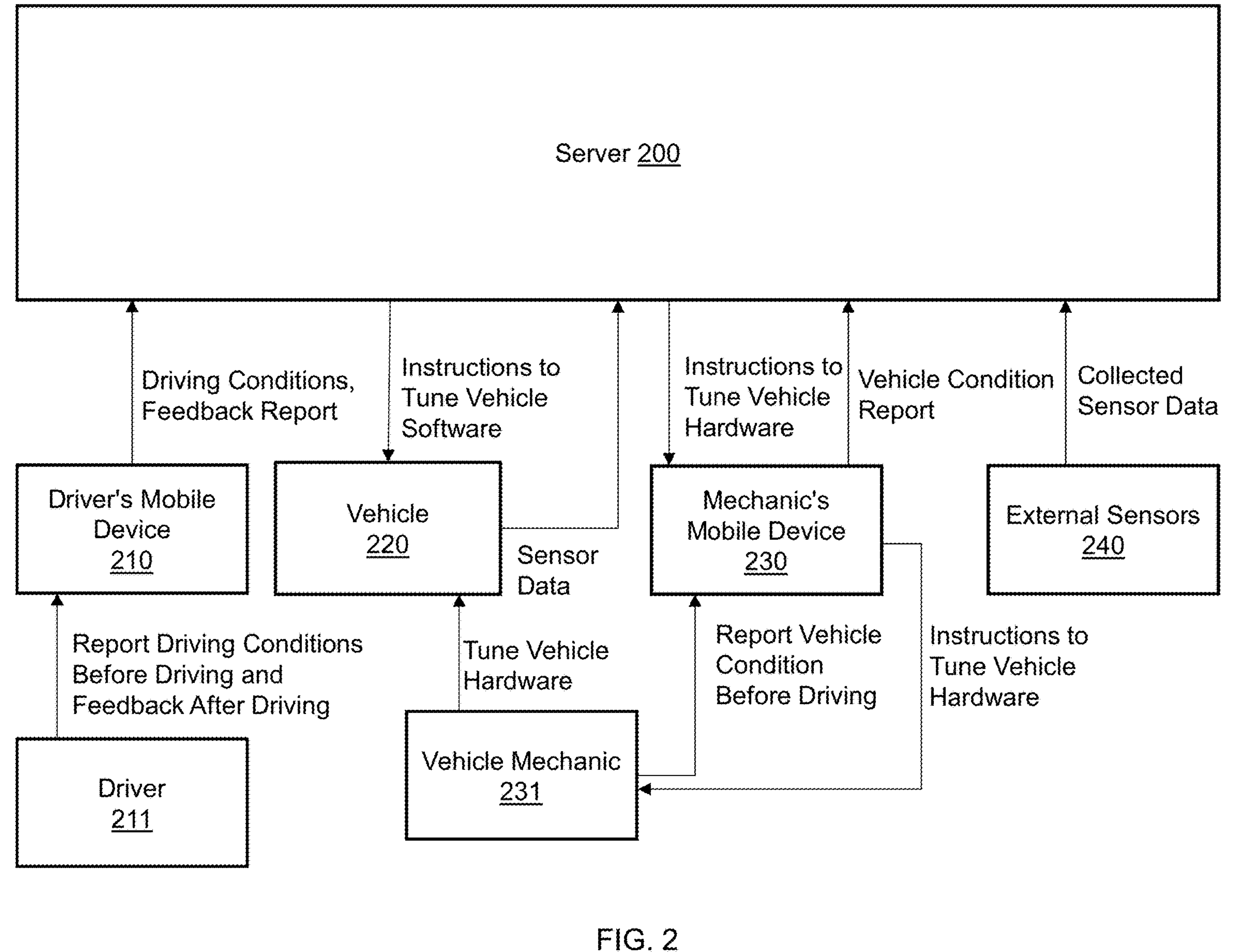
FIG. 2 is a block diagram showing a system architecture for vehicle optimization according to one or more example embodiments.

FIG. 2 is a block diagram showing a system architecture for vehicle optimization according to one or more example embodiments. Server 200, driver's mobile device 210, vehicle 220, mechanic's mobile device 230, and external sensors 240 may be provided, and each may be implemented, for example, by a device such as device 100.

Server 200 may be responsible for collecting data from driver's mobile device 210, vehicle 220, mechanic's mobile device 230, and external sensors 240. Server 200 may be able to interpret the collected data (for example, using machine learning techniques) and provide instructions to tune vehicle hardware (HW) and software (SW) accordingly.

The driver's mobile device 210 may be operated by driver 211, and the mechanic's mobile device 230 may be operated by a vehicle mechanic 231. Driver 211 may be responsible for driving vehicle 220, and vehicle mechanic 231 may be responsible for maintaining, monitoring, and tuning vehicle 220. Although the driver's mobile device 210 and mechanic's mobile device 220 may typically be implemented using a mobile phone, (e.g., a smartphone), in some instances, the mobile device may be implemented using a variety of computer devices, such as, but not limited to, a tablet, a vehicle console, a laptop, a desktop computer, etc. The user of the mobile device (e.g., the driver or the vehicle mechanic) may be able to provide input using a variety of methods including, but not limited to, a physical keyboard, touchscreen, or voice (using voice-to-text interpretation), etc. Although two separate mobile devices are shown in FIG. 2, it should be appreciated that in some cases, it could be the same mobile device.

Driver 211 may be able to interact with the driver's mobile device 210 (for example, via a GUI) to report driving conditions prior to driving, as well as provide a feedback report after driving. For example, the driving conditions may include the driver's condition (for example, their attentiveness, health condition, field of view, etc.). In some embodiments, the driving conditions may also include sensor data obtained from a health meter and driver's mobile device 210 or a health condition report generated by a medical professional through an interview with the driver. According to some embodiments, the driving conditions may include constraints of the drive for the day. In some embodiments, the driving conditions may include priorities of performance metrics. The feedback report of driving, may include the driver's condition, and may also include sensor data taken from the vehicle during the driving (for example, a graph indicating the speed performance, fuel levels, engine temperature, etc.). This may be automatically collected from vehicle 210, or manually input by driver 211, according to embodiments. The reports may be provided in the format of natural language, particularly, in language which may be readily interpreted by a human. According to embodiments, the report may also be provided in the form of a checklist. Driver's mobile device 210 may be able to send these reports to server 200.

Vehicle 220 may include a receiver for receiving instructions (e.g., messages) from server 200, and based on receiving the messages, the vehicle may be automatically able to tune software-related (SW) parameters (for example, electronic/power and/or engine-related configurations). SW parameters may be tuned using an Electronic Control Unit (ECU) in vehicle 220. The vehicle may also have other hardware (HW) which needs to be tuned by vehicle mechanic 231 directly. Vehicle 220 may also be equipped with sensors to collect vehicle sensor data (for example, speedometer data), and send them to the sensor data collector of server 200.

Vehicle mechanic 231 may be able to interact with mechanic's mobile device 230 (for example, via a GUI) to provide vehicle condition reports prior to driving (for example, the tire pressure, suspension height, etc.). The reports may be provided in the format of a natural language. According to embodiments, the report may also be provided in the form of a checklist. Mechanic's mobile device 230 may be able to send these reports to server 200. Mechanic's mobile device 230 may also be able to receive instructions from server 200 to tune vehicle hardware (for example, in the format of an instruction manual in natural language). Vehicle mechanic 231 may be able to interpret the instructions and tune the vehicle hardware of vehicle 220 accordingly. Although not illustrated in FIG. 2, it is appreciated that vehicle mechanic 231 may also provide a feedback report of the vehicle's condition after driving. According to embodiments, vehicle mechanic 231 may be able to provide a feedback report about the quality of the instructions received from server 200 (e.g. regarding the readability, preciseness of the instructions, etc.) via mechanic's mobile device 230, so that server 200 can improve the quality of instructions in the future. In some embodiments, vehicle mechanic 231 may be able to provide information about the constraints of the vehicle tuning via mechanic's mobile device 230 prior to the driving.

External sensors 240 may be configured to measure data related to external conditions of vehicle 220, and send the collected sensor data to server 200. According to embodiments, external sensors 240 may either be separate from or part of the vehicle, depending on the specific implementation. External sensors 240 may also collect data with respect to the driving environment (for example, the weather, humidity, etc.).

Figure 3:
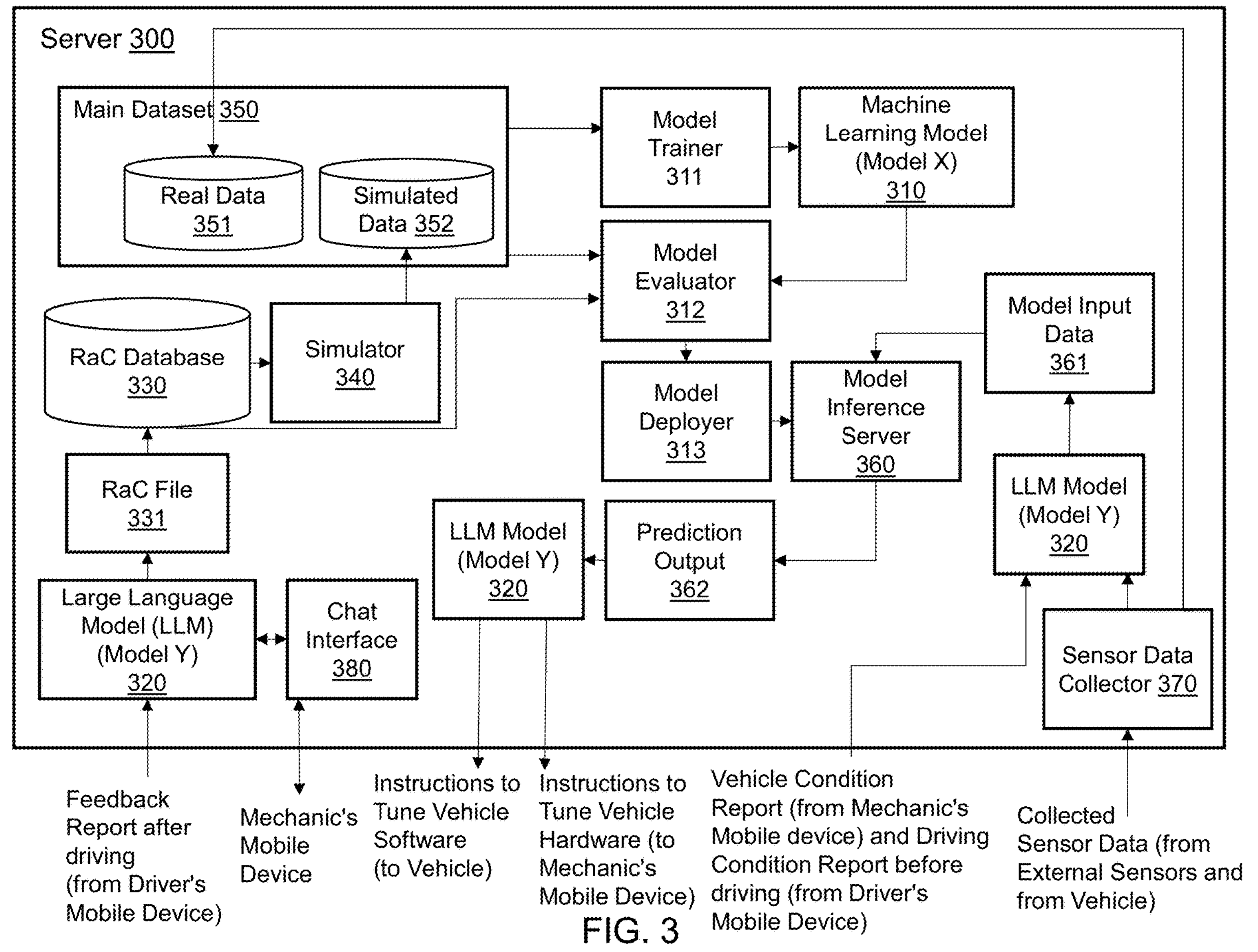
FIG. 3 is a block diagram showing interactions within a server according to one or more example embodiments.

FIG. 3 is a block diagram showing interactions within a server 300 according to one or more example embodiments. Server 300 may correspond to server 200 as illustrated in FIG. 2 above. Server 300 may implement at least two machine learning (ML) models, in particular, a primary ML model 310 may be provided (which may also herein be referred to as 'model X 310'), which may be configured to receive input vehicle software/hardware-related parameters, vehicle conditions/driver conditions, and output prediction of vehicle performance at each vehicle conditions and driver conditions so that the vehicle mechanics, the driver and a Large Language Model (LLM) can efficiently explore the best parameters and conditions for optimizing the vehicle performance. The vehicle performance may include lap time, balance, aero drag, cornering stiffness, fuel efficiency of the vehicle, or driver's satisfaction score, etc. According to one embodiment, model X 310 may directly output tuning parameters in order to optimize the vehicle performance. A Large Language Model (LLM) 320 (which may also herein be referred to as 'model Y 320') may be provided to convert unstructured data written in natural language into structured data (e.g. machine-interpretable code, text data, yaml file, table data, etc), and vice-versa.

According to embodiments, a driving condition report (e.g., from driver's mobile device 210 from FIG. 2 above) and/or a vehicle condition report (e.g., from mechanic's mobile device 230 from FIG. 2 above) prior to driving may be converted by model Y 320, from a natural language into machine-interpretable code. Sensor data collector 370 may collect sensor data from external sensors (e.g., from external sensors 240 from FIG. 2 above) as well as vehicle sensors located in the vehicle, and the collected sensor data may similarly be converted by model Y 320 into machine-interpretable code. Accordingly, model input data 361 may be generated based on the machine-interpretable code to be used as input for model X 310.

Based on model input data 361 (which represents inputs related to vehicle conditions and driver conditions), a deployed version of model X 310, model inference server 360, may be able to output/determine hardware (HW) and software (SW) related parameters of the vehicle which need to be tuned in order to optimize the vehicle's performance, as prediction output 362.

Upon determining the tuning parameters, in prediction output 362, instructions may be sent in order to tune the vehicle to have a more optimal performance. This may be done by processing prediction output 362 using model Y 320 into the appropriate format. SW parameters may be sent directly to the ECU of the vehicle for tuning. On the other hand, HW parameters may not be automatically adjusted/tuned by the vehicle, rather, they may need to be handled by the vehicle mechanic. Accordingly, model Y 320 may interpret the tuning parameters related to the HW parameters, and provide instructions in natural language, for example, in the form of an instruction manual. For instance, it may provide instructions for the vehicle mechanic, such as how to adjust the tire pressure, including which tools should be used. It is contemplated that the mobile device belonging to the vehicle mechanic (e.g. mechanic's mobile device 230), or some other device may be used in order to receive the instruction manual.

According to embodiments, a chat interface 380 may be provided on server 300, in order to interact with a chat GUI on the vehicle mechanic's mobile device (e.g., mechanic's mobile device 230) for tuning the vehicle. Particularly, chat interface 380 may be in communication with model Y 320 in order to assist the vehicle mechanic in exploring the best parameters and conditions in tuning the vehicle (e.g., provide advice on how to perform a particular step, suggest the best tuning parameters and conditions, suggest the tuning parameters with the best sensitivity to the performance metrics, give feedback to the parameters and conditions that the mechanics proposes, etc.). According to embodiments, the instruction manual may also be provided through the chat interface. It should be appreciated that the driver's mobile device (e.g., driver's mobile device 210) may also contain a chat GUI for other purposes (driver assistance related). Further, chat interface 380 may be implemented in order for the vehicle driver and the vehicle mechanic to provide the reports.

According to embodiments, the feedback report received after driving may be converted by model Y 320 from a natural language into structured data (e.g. machine-interpretable code, text data, yaml file, table data, etc.) to be called as Requirements as Code (RaC) file 331 hereinafter. The RaC file may comprise the information regarding requirements (e.g. what output is expected to be provided by server 300 or Model X 310, what is the criteria of the performance of the output, what is the conditions of the driving of the day, what constraints (constraints of tuning parameters) need to be taken care of, etc.). For instance, the RaC file may be a coded file which may include a file identifier which identifies the RaC file; driver information which identifies the vehicle driver and the vehicle driver's condition; vehicle information which identifies the vehicle model, vehicle identification number (VIN) and the vehicle's condition; metric information which defines one or more metrics related to the vehicle's performance and criteria for fulfilling the one or more metrics; and environmental conditions during operation of the vehicle. This file can be readily interpreted by a computer.

RaC files may be stored, for example, in a RaC database 330. RaC files may be used in order to generate simulated data 352 using simulator 340 according to the information in the RaC files (e.g. of requirements, constraints, conditions, vehicle information, driver information. For example, based on at least the conditions (environmental) which may happen during actual driving or were present during actual driving, and the vehicle's condition, a simulation may be performed using simulator 340 in order to simulate vehicle performances (e.g. a lap around a racetrack) at multiple conditions (including the conditions which may happen during actual driving, but not necessarily limited to it). In some embodiments, the simulator 340 may generate simulated data 352 including simulation results for all possible combinations of conditions under the requirements described in the RaC files. Simulated data 352 may be collected in a database in order to be used for training and evaluating model X 310. In some embodiments, RaC files may also be used for defining test metrics and criteria used by model evaluator 312 (to be mentioned later).

Real data 351 may also be received from the sensor data collector 370 (for example, vehicle sensor data received from the vehicle driver's mobile device, which may have been collected during driving), and also directly from the vehicle's sensor data collector. Accordingly, real data 351 and simulated data 352 in combination may form a main dataset 350, which may be used for generating specific datasets for training and evaluating model X 310. In some embodiments, real data 351 may be additionally included in the information in RaC files for more accurate simulation (e.g., which is close to the real data) and for defining accurate test criteria of Model X according to real data 351.

Main dataset 350 may be utilized to generate a training dataset to be used by a model trainer 311 in order to train model X 310. The training dataset may be used as input data by model trainer 311, and also as ground truth data corresponding to the output of model X 310. Training model X 310 intends to further optimize model X 310's ability to convert driving/vehicle conditions into vehicle performance and/or tuning parameters. After training, the trained model X 310 may be evaluated (the term "evaluated" may also be used interchangeably with the term "tested" herein below) by model evaluator 312 in order to check if metrics and criteria, which are defined in RaC file 331 (which may be received from RaC database 330) are fulfilled. Model evaluator 312 may also use an evaluation dataset ("evaluation dataset" may also be referred to as a "test dataset") generated from main dataset 350 in order to perform the evaluation.

After evaluating the trained model X 310, model evaluator 312 may determine that the metrics and criteria are fulfilled. If this is the case, model deployer 313 may deploy an updated version of the trained model X 310 an updated version to model inference server 360. According to some embodiments, a first part of the metrics and criteria from the RaC file may be used for determining whether the model is deployable or not, and a second part of the metrics and criteria from the RaC file may not be used for determining whether the model is deployable or not. For example, when RaC files include 1) the metrics of the difference between the ground truth data and the prediction result of the best spring force time and 2) the metric of the spring force time with target sprint force time as a criteria, only 1) should be used for determining whether the model is deployable or not and 2) may not be used for determining whether the model is deployable or not. This may be because, for example, that the prediction accuracy that can be measured by 1) only matters for determining whether the model is deployable or not, according to some embodiments.

Once the model is deployed, the deployed model may be used for predicting vehicle performance and/or optimized vehicle parameters from the input parameters which is generated by Model Y 320 according to the input from vehicle mechanics, drivers and sensor data. Before being deployed, the optimized vehicle parameters and the predicted results may be provided to vehicle 220, vehicle mechanics 231 via mobile device 230 and vehicle driver 211 via device 210. If the trained model is not deployed because the metrics and criteria are not fulfilled, the trained model may not be used for predicting the results to be provided to them. The performance of model X 310 to determine the optimized vehicle parameters for tuning can be improved via feedback using the ML training/evaluation process.

Figure 4:
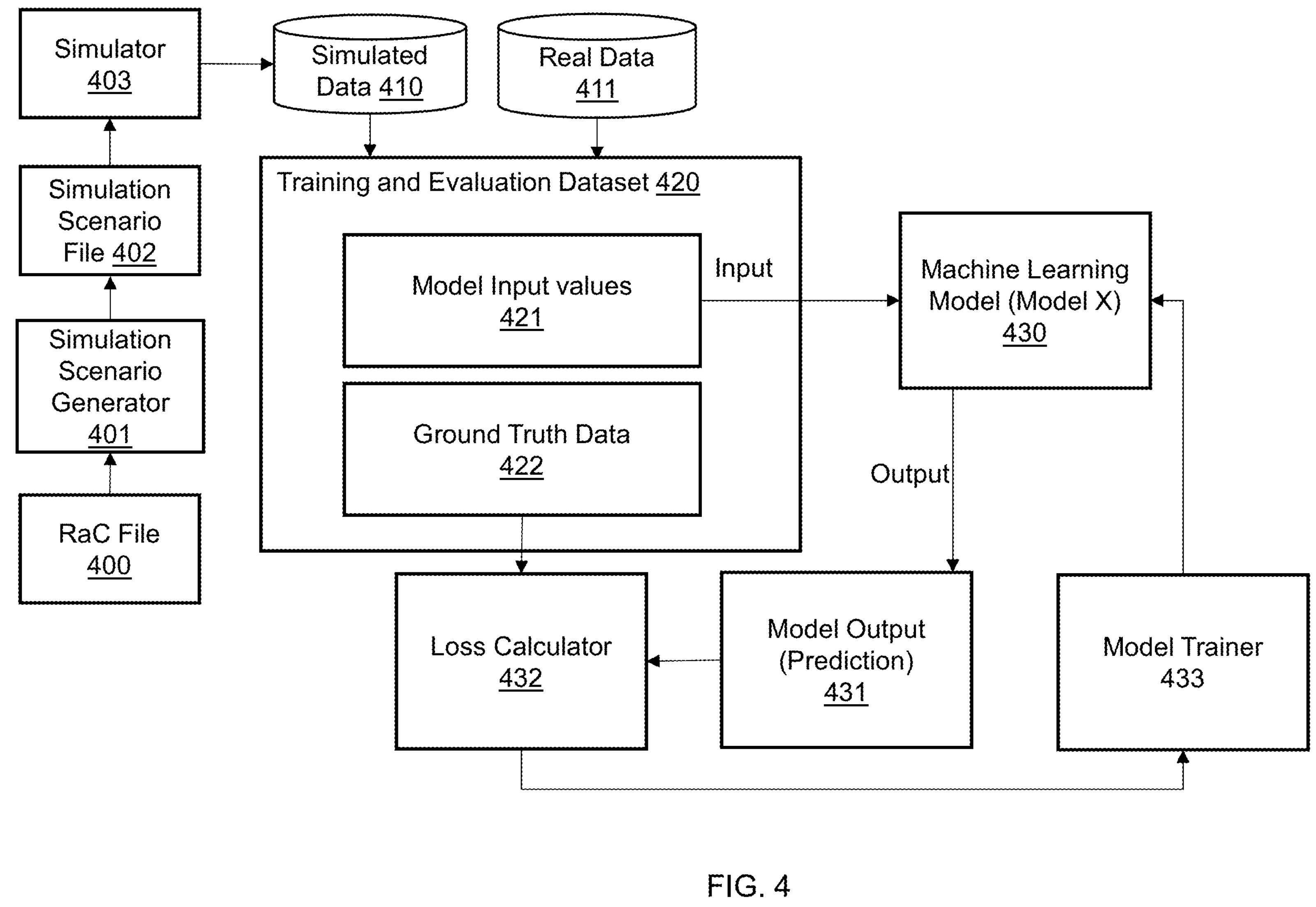
FIG. 4 is a block diagram showing a dataflow for training and evaluating a machine learning model, according to one or more example embodiments.

FIG. 4 is a block diagram showing a dataflow for training and evaluating a machine learning model, according to one or more example embodiments.

A RaC file 400 (such as RaC file 311 illustrated in FIG. 2 above) may be used as input for the simulation scenario generator 401. For example, metric types and criteria, as well as the vehicle information, driver information, and environmental conditions and constraints may be used to create a scenario for which to simulate driving. Accordingly, a simulation scenario 402 can be generated, and input into simulator 403 in order to generate simulated data 410 based on simulating driving using the conditions stipulated in simulation scenario 402. Simulated data 410 may be stored in a database.

A real data database 411 may also contain real data based on actual driving. For example, this may be automatically received from sensors located in a vehicle, or manually input after driving. The simulated data 410 and real data database 411 in combination may form a training and evaluation dataset 420 used to either generate values for model input values 421, or ground truth data 422. That is, the model input values 421 may be used as direct input into model X 430, and the ground truth data 422 (of model input values 421) may be used to verify the output of model X 430.

According to embodiments, model input values 421 may be input into model X 430. The model output 431 will be the prediction formed by model X 430. The model output 431 may be compared with ground truth data 422 using loss calculator 432, and based on the difference between the prediction in model output 431 and ground truth data 422, model trainer 433 may be able to adjust model X 430 so that the predictions may become more accurate.

According to embodiments, model input values 421 may include, but are not necessarily limited to: external parameters, such as which driving course, a driver ID, a driver's condition, a driver's skill, time, weather, wind speed, wind direction, temperature, atmospheric pressure, and humidity, type of vehicle hardware, vehicle hardware parameters, such as ride height related to automotive suspension and vehicle dynamics, spring force gradient, anti-roll bar stiffness, bumpstop, toe, camber, overall grip, as well as vehicle software parameters;

According to embodiments, model output values (as part of model output 431) may include, but are not necessarily limited to, lap time, handling, balance, ride height, aero drag, downforce, tire cornering stiffness, Z force, and driver satisfaction score.

It should be reiterated that the above list of model input and output parameters is merely an example, and other parameters are possible depending on the specific implementation.

Figure 5:
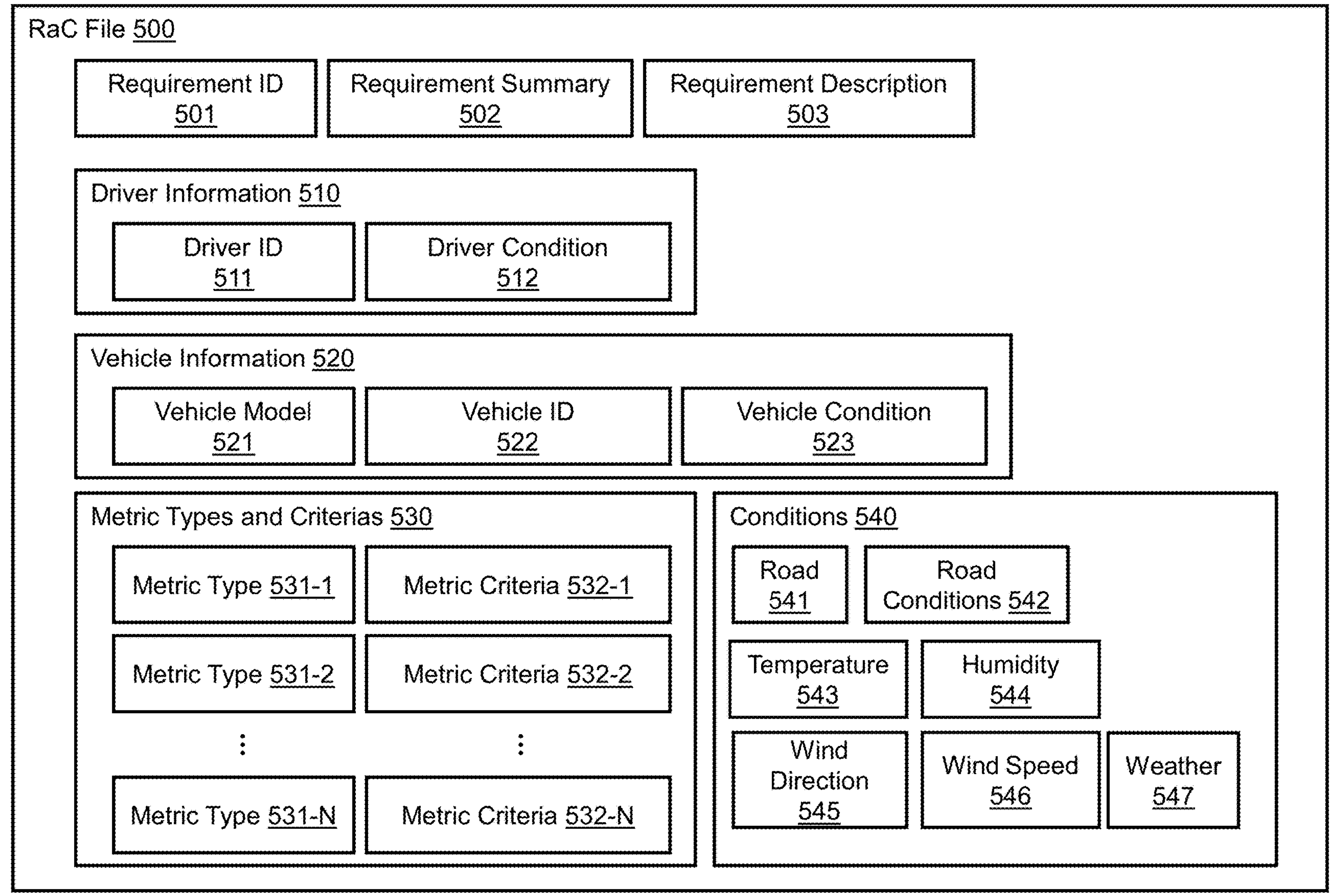
FIG. 5 is a diagram showing an example structure of a requirements as code (RaC) file according to one or more embodiments.

FIG. 5 is a diagram showing an example structure of a requirements as code (RaC) file 500 according to one or more embodiments.

Requirement ID 501, requirement summary 502, requirement description 503 may be used in order to allow the system administrator to quickly understand what the specific RaC File 500 is used for (e.g., which scenario it represents). Requirement ID 501 may be some unique identifier comprising numbers, alphabets and special characters (e.g. XYZ-1234) used to uniquely identify RaC file 501. Requirement summary 502 may be a brief description of what RaC File 500 is used for, and requirement description 503 may be a detailed version of requirement summary 502. Requirement summary 502 and requirement description 503 may be in natural language.

Driver information 510 may comprise a driver ID 511 and driver condition 512. Driver ID 511 may be some unique identifier comprising numbers, alphabets and special characters (e.g. XYZ-1234) used to uniquely identify the driver. Driver condition 512 may be one or more parameters related to the driver's status (for example, their fatigue level, body temperature, weight, etc.). Driver information 510 may include other information related to the driver (e.g. health condition of the day, preference(s) on driving on the day, etc.).

Vehicle information 520 may comprise a vehicle model 521, vehicle ID 522, and vehicle condition 523. Vehicle model 521 may identify the specific make and model of the vehicle. Vehicle ID 522 may be some unique identifier comprising numbers, alphabets and special characters (e.g. XYZ-1234) used to uniquely identify the vehicle, or more specifically, a VIN. Vehicle condition 523 may be one or more parameters related to the vehicle's condition (For example, the vehicle's tire pressure, weight, suspension height, fuel level, etc.).

In some embodiments, vehicle information 520 may also include other information related to the vehicle. For example, vehicle information 520 may include the information related to the constraints of the vehicle, including value constrains of tunable parameters of the vehicle.

Metric types and criteria 530 may define one or more metric types (531-1, 531-2, . . . 531-N) and metric criteria (532-1, 532-2, . . . 532-N). The metric type (531-1, 531-2, . . . 531-N) may refer to what kind of metric is being checked. For example, lap time may be a metric type. As another example, the difference between the ground truth data and the prediction result of the lap time may be a metric type. As another example, the best spring force gradient may be a metric type. As another example, the difference between the ground truth data and the prediction result of the best spring force gradient may be a metric type. For yet another example, acceleration speed may be a metric type. The metric criteria (532-1, 532-2, . . . 532-N) may refer to the specific condition for the corresponding metric type to be fulfilled. For example, in the case that the lap time is a metric type, the metric criteria for the lap time may be "<=120 seconds". For example, in the case that the acceleration speed is a metric type, the metric criteria may be for the acceleration speed to be 0-60 mph in less than 5 seconds. According to embodiments, the metrics may also be regression errors between model outputs and the ground truth of the model output values (e.g., illustrated in FIG. 4). For example, in the case that the difference between the ground truth data and the prediction result of the lap time is a metric type, the metric criteria for the difference may be "<=1.0 seconds".

Conditions 540 (environmental conditions) may define external conditions related to where the vehicle is being driven. For example, road 541, road conditions 542, temperature 543, humidity 544, wind direction 545, wind speed 546, and weather 547 may be included. However, it should be appreciated that this is a non-exhaustive list, and that other types of conditions may be included. In some embodiments, the value of the condition can be a specific value (e.g. 10 C (degree celsius) when the condition is Temperature). In some embodiments, the value of the condition can be a range value (e.g. 10C<=Temperature<=20C when the condition is Temperature).

Figure 6A:
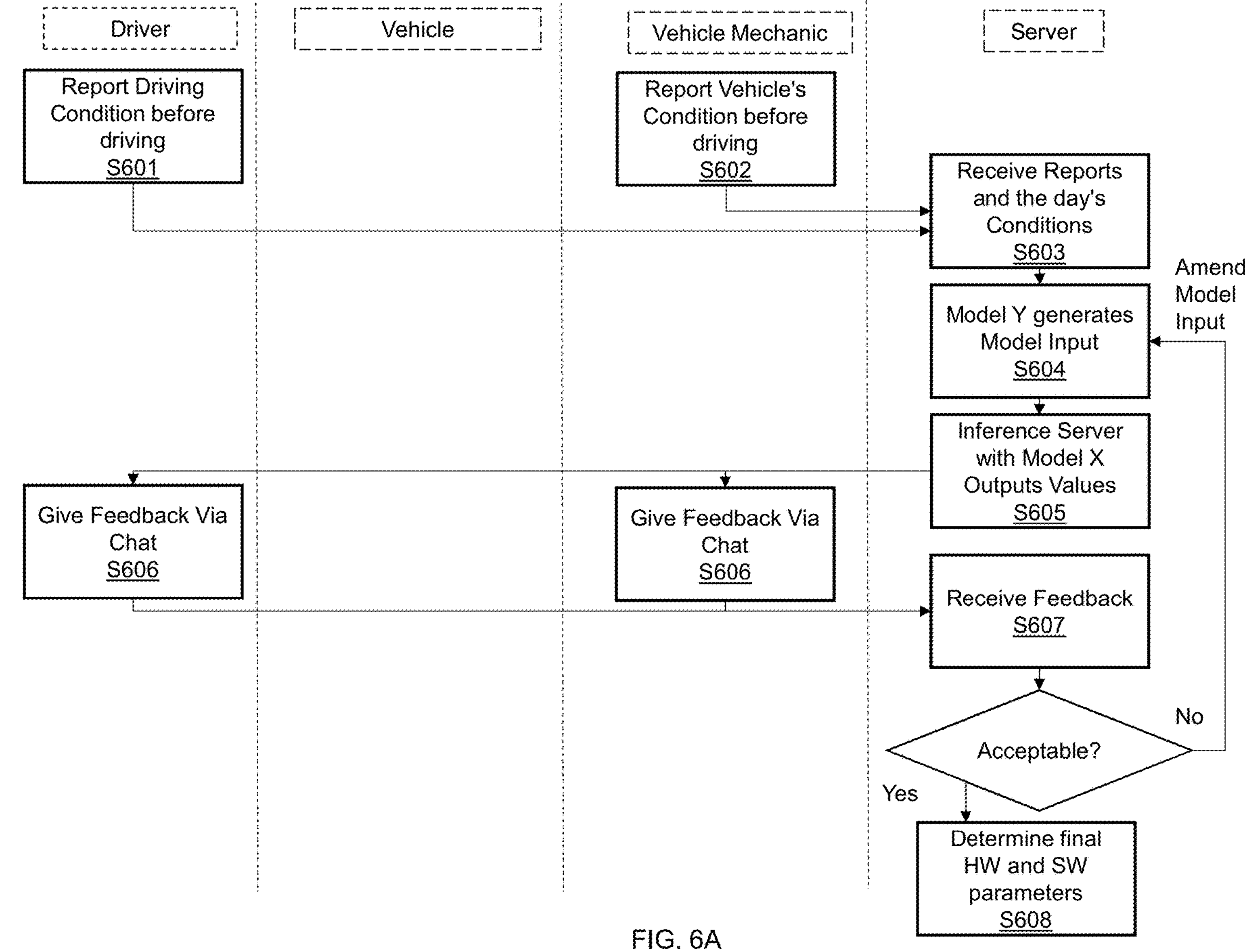
FIGS. 6A, 6B, and 6C is a flowchart diagram showing a method for optimizing vehicle performance including a driver, vehicle, vehicle mechanic, and server, according to one or more embodiments.
Figure 6B:
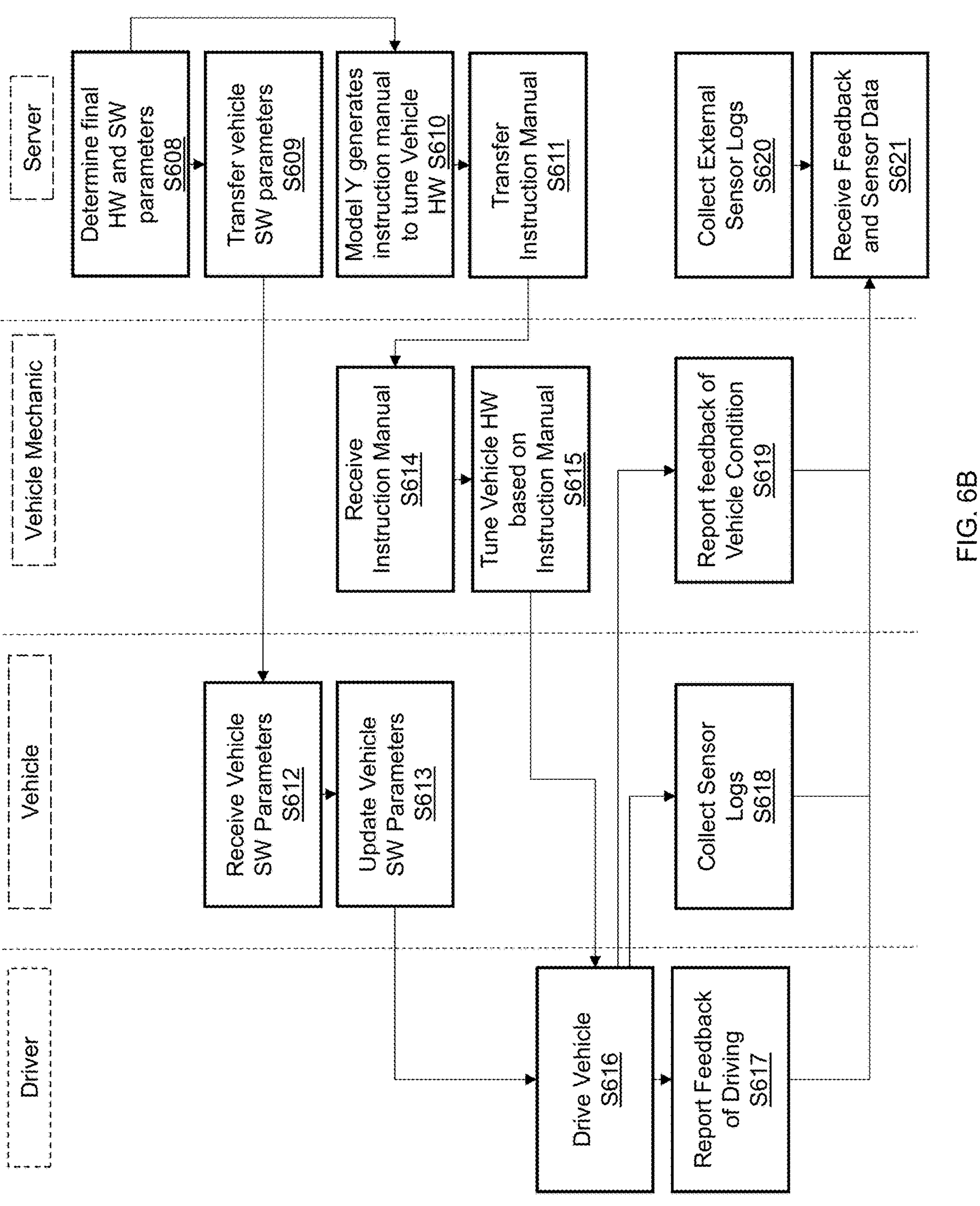
Figure 6C:
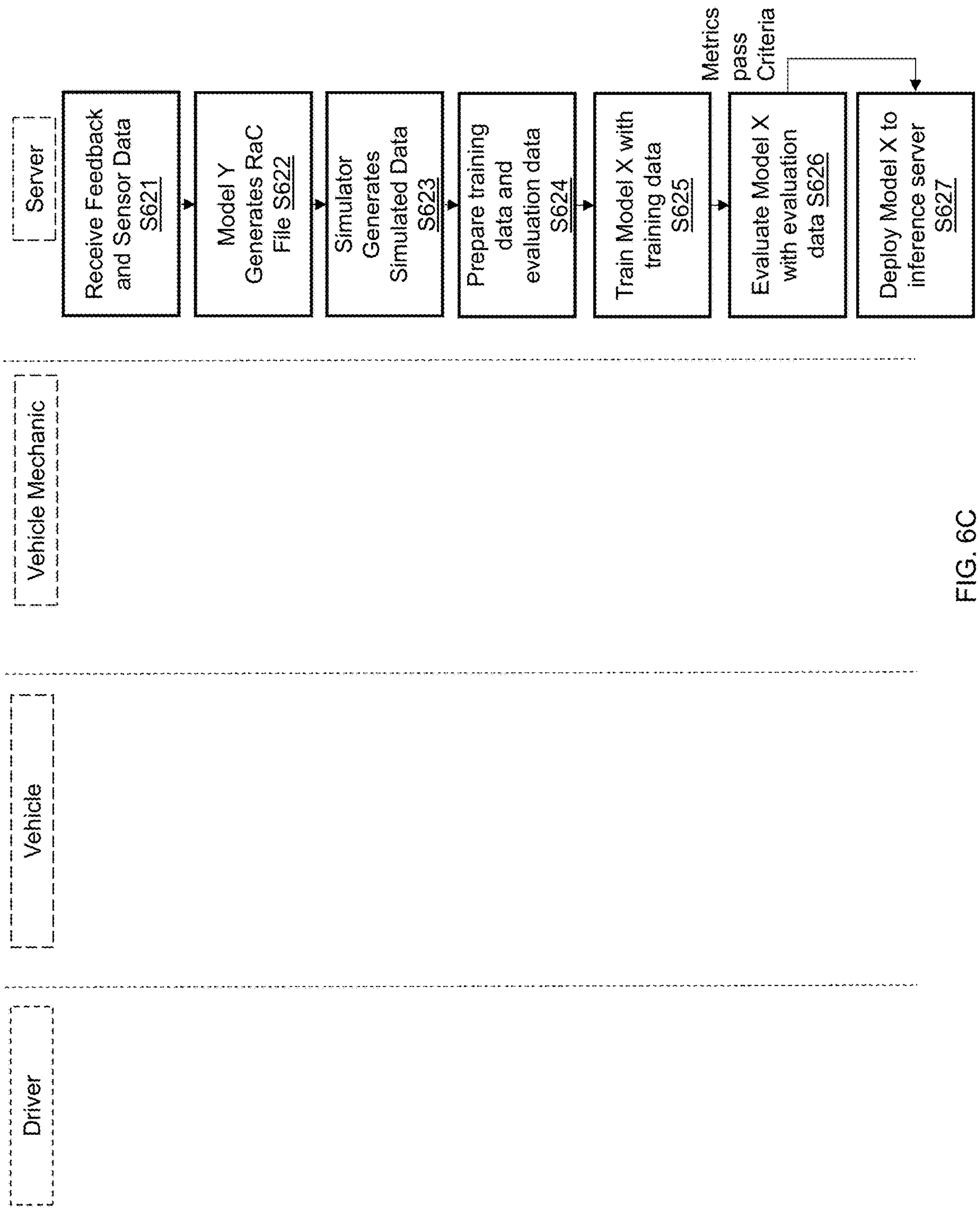

FIGS. 6A, 6B, and 6C is a flowchart diagram showing a method for optimizing vehicle performance including a driver, vehicle, vehicle mechanic, and server, according to one or more embodiments. Although not explicitly illustrated, the driver and vehicle mechanic may perform operations for communicating with the server via a mobile device (refer to FIG. 2)

Referring to FIG. 6A, at operation S601, a driving condition (which may include the day's conditions) may be checked and reported by the driver before driving. Similarly, at operation S602, the vehicle mechanic may check the vehicle's condition and report it prior to driving. In some embodiments, the vehicle mechanic and the driver may write their report via GUI on the mobile device. In some embodiments, the vehicle mechanic and the driver may handwrite the report on a piece of paper and the report may be scanned via optical character recognition (OCR) of the mobile device. These reports sent in operations S601 and S602 may be combined, and received by the server at operation S603. In some embodiments, the driver may give the report including the information about the constraints of the driving of the day. In some embodiments, the vehicle mechanic may give the report including the information about the constraints of tunable parameters of the vehicle of the day.

At operation S604, the server may convert the reports using model Y (e.g., model Y 320) into input data for model X (e.g., model X 310).

At operation S605, An inference server implementing model X may be used to infer predicted performance under given conditions and tuning performance, or tuned parameters optimized for the conditions received from the reports. This may be done by inputting the input data from operation S604 into an inference server implementing model X (e.g., model inference server 360 with deployed model X that is deployed by model deployer 313) and thereby inferring the optimized parameters.

At operation S606, the driver and the vehicle mechanic may be able to view the predicted performance and optimized parameters, and give feedback (e.g., via a chat interface). At operation S607, the server will receive the feedback.

In some embodiments, model Y may also give to the driver and the vehicle mechanic suggestions about if the predicted performance and/or optimized parameters (the output values) are acceptable or not according to the information of metrics and criteria 530 in RaC file 500 so that the driver and the vehicle mechanic can give feedback according to the suggestions.

If it is determined that the predicted performance and/or optimized parameters (the output values) are unacceptable, the input data generation for model X via model Y at operation S604 may amend the model input and operations S604 through S607 may be repeated until deemed as acceptable by the driver, the vehicle mechanic, and model Y.

Once determined that the output values are acceptable, at operation S608, the finalized HW and SW parameters are determined.

Referring now to FIG. 6B, at operation S609, vehicle SW parameters are transferred to the vehicle. At operation S612, the vehicle receives the SW parameters, and at operation S613, the vehicle SW parameters are updated (e.g., via an ECU).

At operation S610, (which may either be performed simultaneous or subsequent to operation S609), model Y generates an instruction manual to tune vehicle HW. At operation S614, the vehicle mechanic receives the instruction manual (for example, via their mobile device, or via a received file such as a text or pdf file which may be printed out manually). At operation S615, the vehicle mechanic may tune the vehicle HW based on the instruction manual received in operation S614, such that the HW parameters are fulfilled.

At operation S616, once the vehicle has been tuned, driving may be performed. At operation. Thereafter, at operation S617, the driver may write a feedback report of driving, at operation S618, the vehicle may collect sensor logs of vehicle data from driving, and at operation S619, the vehicle mechanic may write a feedback report of the vehicle's condition. In some embodiments, the report of the vehicle mechanic may include the feedback about the quality of the instruction manual. The format of the feedback reports may be similar or different to that from before driving, according to embodiments. External sensor logs may also be collected at operation S620 at the server. Operations S617 through S620 may be performed in any order. At operation S621, the feedback and sensor data from operations S617 through S620 may be received by the server.

Referring now to FIG. 6C, at operation S622, model Y may be used in order to generate an RaC File or to update existing RaC files in RaC database. At operation S623, based on the RaC file, the simulator may generate simulated data into the main dataset, which may be used for training and evaluating (testing) model X. At operation S624, training data and evaluation (testing) data may be prepared based on the main dataset. In some embodiments, model Y may update itself for improving the quality of the instruction manuals given to vehicle mechanic and the quality of the chat according to the feedback from the driver and the vehicle mechanics.

At operation S625, training may be performed on Model X using the training data prepared in operation S624. At operation S626, evaluation may be performed using the evaluation data prepared in operation S624, particularly, it may check whether the metrics from the RaC file are fulfilled or not. If the metrics are fulfilled (e.g., they pass the criteria), an updated model X may be deployed to the inference server in operation S627.

Figure 7:
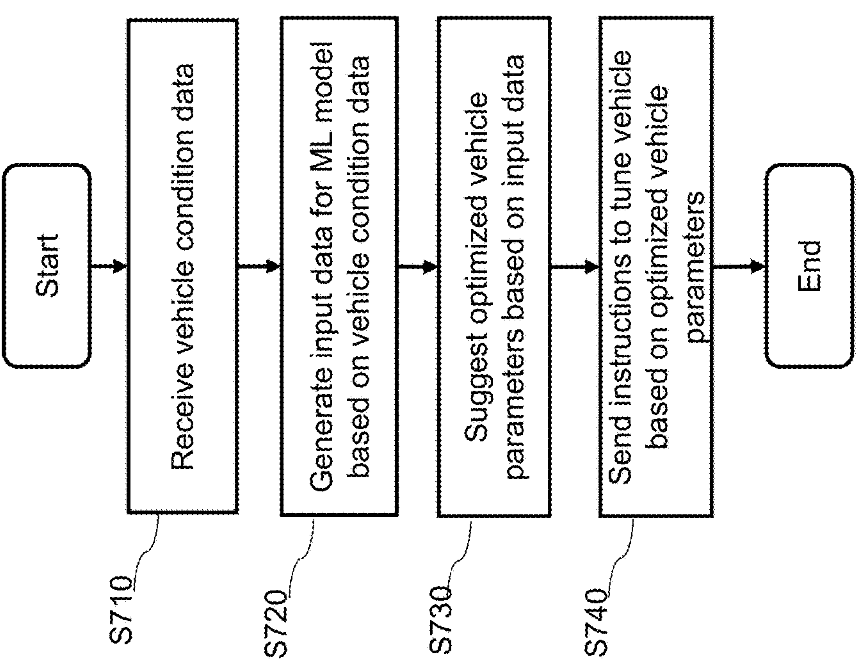
FIG. 7 is a flowchart diagram showing a method for receiving optimized vehicle tuning parameters according to one or more embodiments.

FIG. 7 is a flowchart diagram showing a method 700 for receiving optimized vehicle tuning parameters according to one or more embodiments.

At operation S710, vehicle condition data is received prior to operating the vehicle. The vehicle condition data may include a first report from a vehicle driver indicating the vehicle driver's condition, and a second report from a vehicle mechanic indicating the vehicle's condition. Generating the input data for the ML model (e.g., model X) may include converting, using a large language model (LLM) (e.g., model Y), the first report and second report into machine-readable parameters. The parameters may include either or both of continuous values, such as floating point values, or discrete values, such as categorical variables. The ML model is configured to output at least one of predicted vehicle performance or vehicle parameters based on the vehicle condition data At operation S720, based on the vehicle condition data received in operation S710, input data for a machine learning model is generated.

At operation S730, the ML model may suggest optimized vehicle parameters based on the input data generated in operation S720. According to embodiments, this may include interacting, by at least one of the driver and the vehicle mechanic, with a chat interface, wherein the chat interface is configured to iteratively suggest optimized vehicle conditions and optimized vehicle parameters from the LLM based on the predicted vehicle performance.

At operation S740, based on the optimized vehicle parameters inferred in operation S730, instructions to tune the vehicle may be sent. A first instruction may be sent to an Electronic Control Unit (ECU) of the vehicle to tune software-related parameters of the vehicle, and a second instruction may be sent to the vehicle mechanic to tune hardware-related parameters of the vehicle. The second instruction may be generated as an instruction manual using the LLM, according to embodiments. In some embodiments, the instruction manual may include the instructions for tuning software-related parameters as well as hardware-related parameters.

Figure 8:
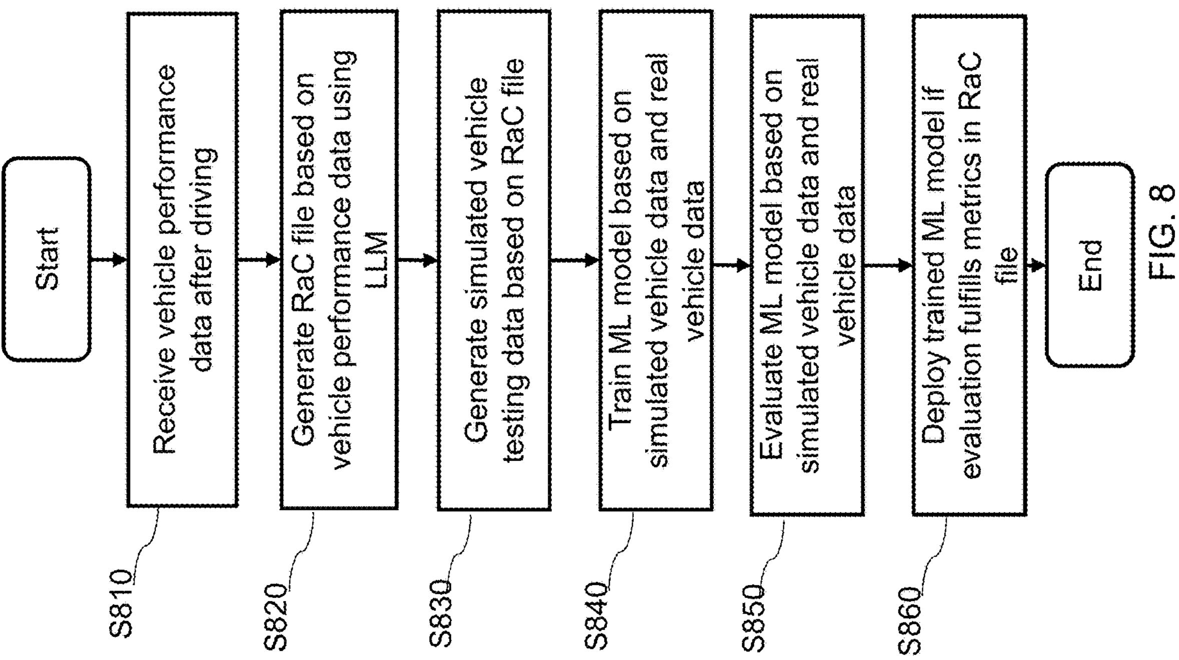
FIG. 8 is a flowchart diagram showing a method for training a machine learning model according to one or more embodiments.

FIG. 8 is a flowchart diagram showing a method 800 for training a machine learning model according to one or more embodiments. It should be appreciated that according to embodiments, method 800 may be performed after the operations in method 700.

Referring to FIG. 8, at operation S810, the performance data regarding model X performance (e.g. accuracy of the prediction of model X) and/or vehicle performance data after operating the vehicle may be received.

At operation S820, based on the vehicle performance data received in operation S810, a Requirements as Code (RaC) file may be generated using a LLM. The RaC file may include a file identifier which identifies the RaC file; driver information which identifies the vehicle driver and the vehicle driver's condition; vehicle information which identifies the vehicle model and the vehicle's condition; metric information which defines one or more metrics related to the vehicle's performance and criteria for fulfilling the one or more metrics; and environmental conditions during operation of the vehicle.

At operation S830, based on the RaC file generated in operation S820, simulated vehicle data may be obtained.

According to some embodiments, when it is determined that the performance of model X is not optimal or poor, the simulated vehicle data, including weak scenes where the model X didn't perform well may be obtained so that model X can overcome the weak scenes by being trained with the data of the weak scenes. In some embodiments, when it is determined that the performance of model X is not optimal or poor due to overfitting during model training, a larger amount of simulated vehicle data may be obtained for obtaining better generalization performance, without overfitting to training data.

At operation S840, the ML model may be trained based on simulated vehicle data and real vehicle data from vehicle performance data. The vehicle performance data may include feedback from the vehicle driver, sensor data from the vehicle, and feedback from the vehicle mechanic, and the real vehicle data may correspond to sensor data received from the vehicle (or from external sensors). In some embodiments, only simulated vehicle data out of the simulated vehicle data and real vehicle data may be used for training ML models.

At operation S850, the ML model may be evaluated based on simulated vehicle data and real vehicle data.

At operation S860, based on evaluating that the ML model fulfills one or more metrics in the RaC file, the trained ML model may be deployed.

By providing a machine learning (ML) model which can output vehicle parameters for tuning the vehicle based on provided vehicle condition data, optimized vehicle performance can be achieved. Since the ML model can be trained and re-evaluated based on simulated and real vehicle data, the ML model can also be improved (thereby further improving vehicle performance when using the ML model). Since a large language model (LLM) may be implemented, the user may be able to readily interpret data which is output from the ML model in natural language, and the ML model may be able to receive input data which is originally in natural language from the user. The know-how of veteran vehicle mechanics may thus be accumulated in the LLM through feedback iterations, which may facilitate the transfer of know-how to other vehicle mechanics. In addition, the know-how of veteran vehicle drivers may thus be accumulated in the LLM through feedback iterations, which may facilitate the transfer of know-how to other vehicle drivers.

The foregoing disclosure provides illustration and description, but is not intended to be exhaustive or to limit one or more example embodiments to the precise form disclosed. Modifications and variations are possible in light of the disclosure or may be acquired from practice of one or more example embodiments.

One or more example embodiments may relate to a system, a method, and/or a computer readable medium at any possible technical detail level of integration. Further, one or more of the components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more example embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible example embodiments of systems, methods, and computer readable media according to one or more example embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the drawings. In one or more alternative example embodiments, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of one or more example embodiments. Thus, the operation and behavior of the systems and/or methods were described herein without reference to specific software code—it being understood that software and hardware may be designed to implement the systems and/or methods based on the description herein.

What is claimed is:

1. A method for optimizing performance of a vehicle, the method comprising:

receiving vehicle condition data prior to operating the vehicle;

generating, based on the vehicle condition data, input data for a machine learning (ML) model, wherein the ML model is configured to output at least one of predicted vehicle performance or vehicle parameters based on the vehicle condition data;

obtaining, based on the ML model, vehicle parameters based on the input data; and sending, based on the vehicle parameters, instructions to tune the vehicle, wherein training the ML model further comprises:

receiving vehicle performance data after operating the vehicle;

generating, based on the vehicle performance data, a Requirements as Code (RaC) file using a Large Language Model (LLM);

generating, based on the RaC file, simulated vehicle data; and training the ML model based on simulated vehicle data.

2. The method of claim 1, wherein the vehicle condition data comprises a first report from a vehicle driver indicating the vehicle driver's condition, and a second report from a vehicle mechanic indicating the vehicle's condition, wherein generating the input data for the ML model comprises converting, using the LLM, the first report and the second report into machine-readable parameters.

3. The method of claim 2, wherein obtaining the vehicle parameters comprises interacting, with at least one of the vehicle driver and the vehicle mechanic, via a chat interface, wherein the chat interface is configured to iteratively suggest vehicle conditions and vehicle parameters from the LLM based on the predicted vehicle performance.

4. The method of claim 2, wherein sending the instructions to tune the vehicle comprises:

sending a first instruction to an Electronic Control Unit (ECU) of the vehicle to tune software-related parameters of the vehicle; and sending a second instruction to the vehicle mechanic to tune hardware-related parameters of the vehicle, wherein the second instruction is generated as an instruction manual using the LLM.

5. The method of claim 2, wherein training the ML model is further based on real vehicle data from the vehicle performance data, wherein the vehicle performance data comprises feedback from the vehicle driver, sensor data from the vehicle, and feedback from the vehicle mechanic, wherein the real vehicle data corresponds to the sensor data.

6. The method of claim 5, wherein the RaC file comprises:

a file identifier which identifies the RaC file;

driver information which identifies the vehicle driver and the vehicle driver's condition;

vehicle information which identifies the vehicle model and the vehicle's condition;

metric information which defines one or more metrics related to the vehicle's performance and criteria for fulfilling the one or more metrics; and environmental conditions during operation of the vehicle.

7. The method of claim 6, further comprising:

evaluating the ML model based on simulated vehicle data and/or the real vehicle data; and based on evaluating that the ML model fulfills the one or more metrics in the RaC file, deploying the trained ML model.

8. An apparatus for optimizing performance of a vehicle, the apparatus comprising:

at least one memory storing computer-executable instructions; and at least one processor configured to execute the computer-executable instructions to:

receive vehicle condition data prior to operating the vehicle;

generate, based on the vehicle condition data, input data for a machine learning (ML) model, wherein the ML model is configured to output at least one of predicted vehicle performance or vehicle parameters based on the vehicle condition data;

obtain, based on the ML model, vehicle parameters based on the input data; and send, based on the vehicle parameters, instructions to tune the vehicle, wherein to train the ML model the at least one processor configured to execute the computer-executable instructions to:

receive vehicle performance data after operating the vehicle;

generate, based on the vehicle performance data, a Requirements as Code (RaC) file using a Large Language Model (LLM);

generate, based on the RaC file, simulated vehicle data; and train the ML model based on simulated vehicle data.

9. The apparatus of claim 8, wherein the vehicle condition data comprises a first report from a vehicle driver indicating the vehicle driver's condition, and a second report from a vehicle mechanic indicating the vehicle's condition, wherein the at least one processor is configured to generate the input data for the ML model by converting, using the LLM, the first report and the second report into machine-readable parameters.

10. The apparatus of claim 9, wherein the at least one processor is configured to obtain the vehicle parameters by interacting, with at least one of the vehicle driver and the vehicle mechanic, via a chat interface, wherein the chat interface is configured to iteratively suggest vehicle conditions and vehicle parameters from the LLM based on the predicted vehicle performance.

11. The apparatus of claim 9, wherein the at least one processor is configured to send the instructions to tune the vehicle by:

sending a first instruction to an Electronic Control Unit (ECU) of the vehicle to tune software-related parameters of the vehicle; and sending a second instruction to the vehicle mechanic to tune hardware-related parameters of the vehicle, wherein the second instruction is generated as an instruction manual using the LLM.

12. The apparatus of claim 9, wherein training the ML model is further based on real vehicle data from the vehicle performance data, wherein the vehicle performance data comprises feedback from the vehicle driver, sensor data from the vehicle, and feedback from the vehicle mechanic, wherein the real vehicle data corresponds to the sensor data.

13. The apparatus of claim 12, wherein the RaC file comprises:

a file identifier which identifies the RaC file;

driver information which identifies the vehicle driver and the vehicle driver's condition;

vehicle information which identifies the vehicle model and the vehicle's condition;

metric information which defines one or more metrics related to the vehicle's performance and criteria for fulfilling the one or more metrics; and environmental conditions during operation of the vehicle.

14. The apparatus of claim 13, wherein the at least one processor is further configured to execute the computer-executable instructions to:

evaluate the ML model based on simulated vehicle data and/or the real vehicle data; and based on evaluating that the ML model fulfills the one or more metrics in the RaC file, deploy the trained ML model.

15. A non-transitory computer-readable recording medium having recorded thereon instructions executable by at least one processor to cause the at least one processor to perform a method comprising:

receiving vehicle condition data prior to operating the vehicle;

generating, based on the vehicle condition data, input data for a machine learning (ML) model, wherein the ML model is configured to output at least one of predicted vehicle performance or vehicle parameters based on the vehicle condition data;

obtaining, based on the ML model, vehicle parameters based on the input data; and sending, based on the vehicle parameters, instructions to tune the vehicle, wherein training the ML model further comprises:

receiving vehicle performance data after operating the vehicle;

generating, based on the vehicle performance data, a Requirements as Code (RaC) file using a Large Language Model (LLM);

generating, based on the RaC file, simulated vehicle data; and training the ML model based on simulated vehicle data.

16. The non-transitory computer-readable recording medium of claim 15, wherein the vehicle condition data comprises a first report from a vehicle driver indicating the vehicle driver's condition, and a second report from a vehicle mechanic indicating the vehicle's condition, wherein generating the input data for the ML model comprises converting, using the LLM, the first report and the second report into machine-readable parameters, wherein obtaining the vehicle parameters comprises interacting, with at least one of the vehicle driver and the vehicle mechanic, via a chat interface, wherein the chat interface is configured to iteratively suggest vehicle conditions and vehicle parameters from the LLM based on the predicted vehicle performance, wherein sending the instructions to tune the vehicle comprises:

sending a first instruction to an Electronic Control Unit (ECU) of the vehicle to tune software-related parameters of the vehicle; and sending a second instruction to the vehicle mechanic to tune hardware-related parameters of the vehicle, wherein the second instruction is generated as an instruction manual using the LLM.

17. The non-transitory computer-readable recording medium of claim 16, wherein training the ML model is further based on real vehicle data from the vehicle performance data, wherein the vehicle performance data comprises feedback from the vehicle driver, sensor data from the vehicle, and feedback from the vehicle mechanic, wherein the real vehicle data corresponds to the sensor data.

18. The non-transitory computer readable recording medium of claim 17, wherein the method further comprises:

evaluating the ML model based on simulated vehicle data and/or the real vehicle data; and based on evaluating that the ML model fulfills one or more metrics in the RaC file, deploying the trained ML model.

* * * * *